F. T. COLE & A. C. EVANS.
OVERSHOE FOR HORSES.
APPLICATION FILED MAR. 22, 1915.
1,150,577.
Patented Aug. 17, 1915.
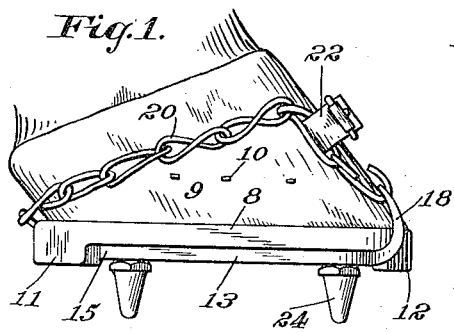
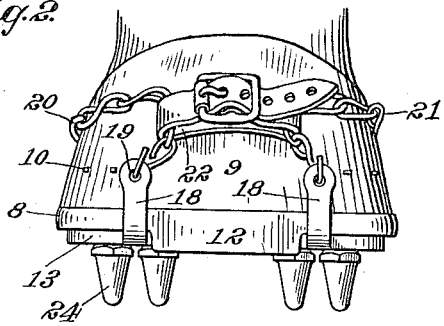
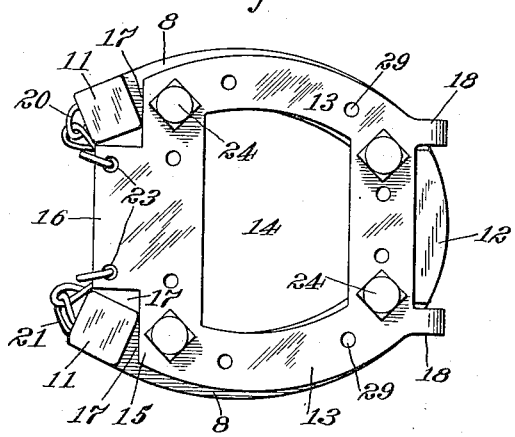
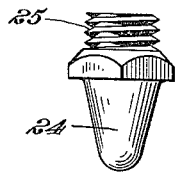
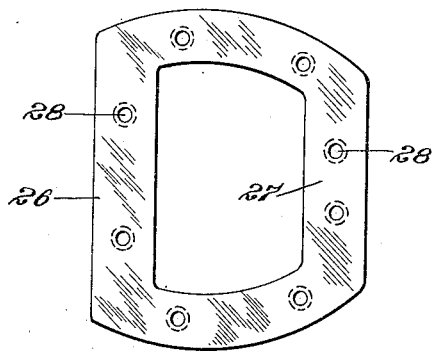
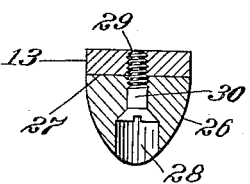
Inventors
Franklin T. Cole
Arthur C. Evans
By Mann & Co.
Attorneys.

UNITED STATES PATENT OFFICE.

FRANKLIN T. COLE AND ARTHUR C. EVANS, OF ROLAND PARK, MARYLAND.

OVERSHOE FOR HORSES.

1,150,577. Specification of Letters Patent. Patented Aug. 17, 1915.

Application filed March 22, 1915. Serial No. 15,998.

*To all whom it may concern:*

Be it known that we, FRANKLIN T. COLE and ARTHUR C. EVANS, citizens of the United States, residing at Roland Park, in the county of Baltimore and State of Maryland, have invented certain new and useful Improvements in Overshoes for Horses, of which the following is a specification.

This invention relates to an improved base-plate for attachment to the feet of horses.

One object of the invention is to provide an improved attachment to be applied to the shoes of horses without any parts of the attaching device projecting laterally from the opposite sides of the shoe, which structure of attaching device insures that the device secured to one foot of an animal will not injure the leg or fleshy part of another foot.

Another object is to provide an improved base-plate to be applied to a metal shoe on the hoof of a horse by flexible means that only partly surrounds the animal's hoof, said base-plate having provision for holding either ice-creepers in winter or a rubber tread in summer.

The invention is illustrated in the accompanying drawing, in which,—

Figure 1, is a side elevation of the hoof of a horse with an ordinary shoe attached thereto by nails, and with the improved base-plate applied to the shoe by flexible means which partly surrounds the hoof—said base-plate holding ice-creepers. Fig. 2, is a front view of the same parts shown in Fig. 1. Fig. 3, is a bottom plan view of the same parts shown in Figs. 1 and 2. Fig. 4, is a view on a larger scale of one of the steel prongs detached from the base-plate. Fig. 5, is a top plan view of the rubber tread. Fig. 6, is a side view of the metal base-plate and the rubber-tread attached thereto. Fig. 7, is a vertical cross-section on a larger scale on the line 7—7 of Fig. 6 showing the screw attaching a rubber tread to the steel base-plate.

Referring to the drawing an ordinary horse shoe 8, fits on the bottom of the hoof 9, to which it is secured by nails 10, as usual. This horse shoe has the familiar heel and toe calks, 11 and 12, respectively. A base-plate 13, has an outline shape in general like the horse-shoe and with an open center 14; at each side adjacent the heel is a corner 15, at the rear is a backward projecting end 16, and between each corner 15, and said back end is a notch 17, into which takes a heel-calk 11, of the shoe when the base-plate is in its position on the bottom of the shoe. At its forward end the base-plate is provided with two hooks 18, which turn upward and curve back over the toe part of the shoe 8, and also over the toe of the hoof; these hooks take on opposite sides of the toe-calk 12, and the top end of each hook is provided with a hole 19.

The means for confining the base-plate to the nailed shoe 8, comprises two chains 20, 21, and a strap 22, at the front of the hoof that connects and tightens the two chains about the hoof. When the chains and strap are tightened one of the chains has position at one side of the hoof and the other chain at the opposite side and both chains are well up on the hoof where the latter is narrow. Each chain has an end connected with the hole 19, of one front hook and the other end connected with a hole 23, in the back-projecting end 16.

It will be seen the chains and strap are flexible and in confining the base-plate to the shoe 8, these so combine on the hoof that no part of the chain bears against the fleshy part of the animal's heel, and do not entirely surround the hoof, there being neither chain nor strap at the rear across the heel, as will be seen by reference to Figs. 1 and 3 of the drawing. Furthermore it will be seen by reference to Figs. 2 and 3, that no part of this attaching device projects beyond the sides of the shoe, and therefore this device on one foot will not injure the leg or fleshy part of another foot.

The base-plate for winter use when the road is slippery with ice will have four prongs or ice-creepers 24; the enlarged view of one prong seen in Fig. 4, shows a screw-threaded shank 25, which enters a threaded hole in the base-plate; these prongs may be unscrewed and removed.

For summer or mild weather use we have provided for substituting on the base-plate a rubber tread 26, for the ice-creeper prongs 24. This rubber tread is shown in Figs. 5, 6 and 7; its plan shape is that of a capital letter D; its upper surface 27, is flat and makes close contact with the lower surface of the base-plate 13, as shown in Figs. 6 and 7. The rubber tread has holes 28, and the base-plate holes 29, positioned to correspond with said holes of the rubber tread, and screws 30, in these holes connect the tread with the plate.

The four holes in the metal base-plate 13, that receive the shanks 25, of the prongs, are of larger size than the eight holes 28, that receive the screws 30.

Fig. 7 shows the shape in cross-section of the rubber-tread 26, which is a half oval shape.

The screws 30, enter the countersunk holes 28, of the tread and the screw-heads seat within said holes, while the point ends of the screws enter the holes 29, in the metal base-plate 13.

When the rubber tread is used the two front hooks 18, on the base-plate retain the same position relative to the horse-shoe 8, and to the toe of the hoof 9, that is shown in Figs. 1, 2 and 3 where the tread is not used. Also the chains 20, 21, and the tightening strap 22, are employed exactly in the same way when the rubber tread is used as they are when the prongs 24, are substituted for the rubber tread.

Having thus described our invention what we claim is,—

1. The combination of a horse-shoe having heel and toe-calks and adapted to be nailed to an animal's hoof; a metal base-plate having a notch at each back corner which receives a heel-calk and also having between said two notches a backward-projecting end, and said plate provided at its forward end with two hooks which turn up in front of said horse-shoe; two separate chains each adapted to take position at an opposite side of an animal's hoof—each chain connecting one of said front hooks with the said backward-projecting end of the base-plate; and means connecting said two chains at their front part and serving to tighten the chains about the sides of the animal's hoof.

2. The combination of a horse-shoe having heel and toe-calks and adapted to be nailed to an animal's hoof; a metal base-plate having a notch at each back corner which receives a heel-calk and also having between said two notches a backward-projecting end, and said plate provided at its forward end with two hooks which turn up in front of said horse-shoe; two separate chains each adapted to take position at an opposite side of an animal's hoof—each chain connecting one of said front hooks with the said backward-projecting end of the base-plate; a strap connecting said two chains and serving to tighten them about the sides of the hoof; and means attached to the bottom of said metal base-plate to contact with the ground and prevent an animal from slipping.

3. The combination of a horse-shoe adapted to be nailed to an animal's hoof; a metal base-plate whose bottom is provided with means to contact with the ground to prevent an animal from slipping, and said plate provided at its forward end with an upturned portion in front of said horse-shoe; two separate chains each adapted to take position at an opposite side of an animal's hoof—each chain connecting said up-turned portion with the said back part of the base-plate; and a strap connecting said two chains and tightening them about the sides of the hoof.

In testimony whereof we affix our signatures in presence of two witnesses.

FRANKLIN T. COLE.
ARTHUR C. EVANS.

Witnesses:
PORTER H. FLAUTT,
BERTHA K. WALTER.

Copies of this patent may be obtained for five cents each, by addressing the "Commissioner of Patents, Washington, D. C."